(12) United States Patent
Boustead et al.

(10) Patent No.: US 10,155,164 B2
(45) Date of Patent: Dec. 18, 2018

(54) IMMERSIVE AUDIO COMMUNICATION

(75) Inventors: Paul Andrew Boustead, Fairlight (AU); Farzad Safaei, Mount Keira (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 2564 days.

(21) Appl. No.: 11/993,800

(22) PCT Filed: Jun. 23, 2006

(86) PCT No.: PCT/AU2006/000881
§ 371 (c)(1),
(2), (4) Date: Jan. 22, 2010

(87) PCT Pub. No.: WO2006/135979
PCT Pub. Date: Dec. 28, 2006

(65) Prior Publication Data
US 2010/0162119 A1   Jun. 24, 2010

(30) Foreign Application Priority Data
Jun. 24, 2005   (AU) ............................... 2005903357

(51) Int. Cl.
*G06F 3/16*   (2006.01)
*G06F 3/048*   (2013.01)
(Continued)

(52) U.S. Cl.
CPC ............. *A63F 13/54* (2014.09); *A63F 13/10* (2013.01); *A63F 13/332* (2014.09); *A63F 13/92* (2014.09);
(Continued)

(58) Field of Classification Search
USPC .................................. 715/727, 757; 709/204
See application file for complete search history.

(56) References Cited

U.S. PATENT DOCUMENTS 5,736,982 A * 4/1998 Suzuki ................... G06T 15/30
348/E7.083
6,106,399 A    8/2000 Baker et al.
(Continued)

FOREIGN PATENT DOCUMENTS

CN    1570946       1/2005
GB    2349055 A    10/2000

OTHER PUBLICATIONS

Mueller, Wolfgang et al. "A Scalable System for 3D Audio Ray Tracing" Multimedia Computing and Systems, 1999, IEEE International Conference on Florence, Italy Jun. 7-11, 1999, Los Alamitos, CA, USA, IEEE Comput. Soc, US, 5 pages.

(Continued)

*Primary Examiner* — Tadesse Hailu
*Assistant Examiner* — Darrin Hope

(57) ABSTRACT

A method and system for using spatial audio in a virtual environment, which is capable of running on portable devices with limited processing power, and utilizing low bandwidth communication connections. The system identifies a first avatar in the virtual environment; and determines if the avatar satisfies a reuse criterion, which will enable the system to reuse the audio information which has been generated for a second avatar in the virtual environment for the first avatar.

12 Claims, 4 Drawing Sheets

(51) Int. Cl.
  *A63F 13/54* (2014.01)
  *A63F 13/332* (2014.01)
  *A63F 13/92* (2014.01)
  *A63F 13/40* (2014.01)

(52) U.S. Cl.
  CPC ............... *A63F 2300/6063* (2013.01); *A63F 2300/6081* (2013.01); *A63F 2300/64* (2013.01)

(56) References Cited

U.S. PATENT DOCUMENTS

| | | | |
|---|---|---|---|
| 6,816,846 B1 | 11/2004 | Back et al. | |
| 7,346,654 B1* | 3/2008 | Weiss | 709/204 |
| 2002/0032697 A1 | 3/2002 | French | |
| 2003/0031334 A1* | 2/2003 | Layton | H04R 27/00 381/310 |
| 2005/0108646 A1 | 5/2005 | Willins | |

OTHER PUBLICATIONS

Cardoso, Jorge et al. "Soundserver: Data Sonification on-demand for Computational Instances" ICAD2004, Proceedings of the 10$^{th}$ International Conference on Auditory Display, Jul. 6-9, 2004, 4 pages.

Burgess, David "Techniques for Low Cost Spatial Audio" Proceedings of UIST '92, Nov. 15, 1992, pp. 53-59.

Lu, Dong et al. "Virtualized Audio: A Highly Adaptive Interactive High Performance Computing Application" Proc. 6$^{th}$ Workshop on Languages, Compilers, and Run-Time Systems for Scalable Computers, Mar. 2002, 14 pages.

Extended European Search report for European patent application No. 06741272.6-2218, dated Feb. 16, 2010, 9 pages.

* cited by examiner

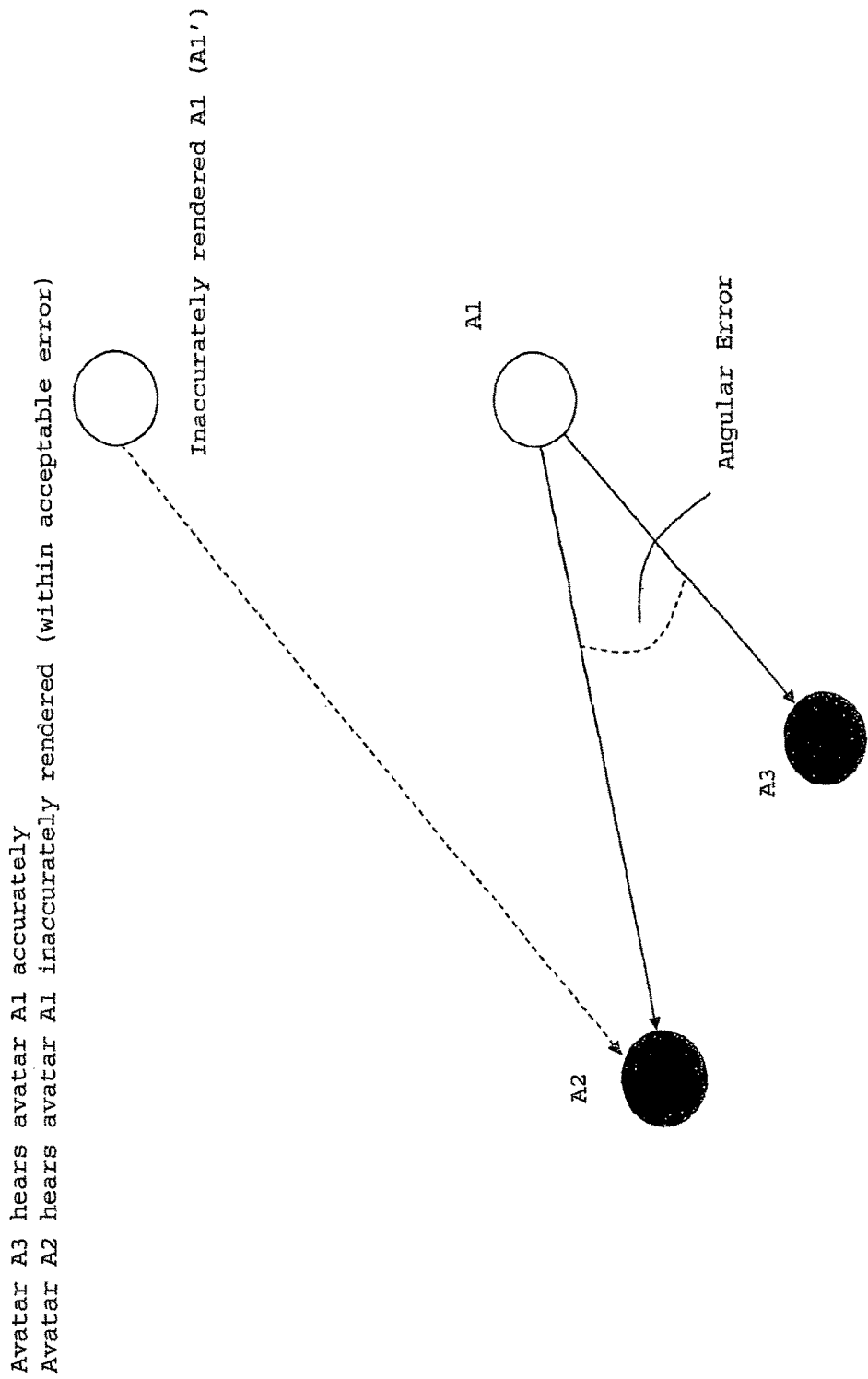

IMMERSIVE AUDIO COMMUNICATION

FIELD OF THE INVENTION

The present invention relates generally to the field of immersive audio communication, and has particular—but by no means—exclusive application to immersive audio scenes associated with avatars of a virtual environment.

BACKGROUND OF THE INVENTION

Traditionally, distributed virtual environments (such as multiplayer on-line games) used rudimentary means for allowing users to communication with each other. For example, some distributed virtual environments have employed text-based communication while other virtual environments have supported simple mono voice over internet protocol technology.

It has been suggested that users' perceptions of virtual environments can be improved by augmenting the virtual environments with either medium or high quality audio communication. Consequently, considerable research has been carried out to provide distributed virtual environments with real-time immersive audio communications. Much of the research has focused on providing the users with spatial audio that conveys a perception of direction and distance; that is, the audio information sounds like it is emanating from a particular direction and has traveled a certain distance.

Research in to providing distributed virtual environments with immersive audio communication has generally assumed that users of virtual environments will use computing devices (such as a desktop computer) that have a reasonable amount of processing power and which are connected to the virtual environment server via a relatively high bandwidth data link. As such, today's immersive audio communication technology generally involves distributed immersive audio scene computations across one or more central servers and users' computing devices.

The recent uptake of portable wireless computing devices, such as the Nokia N-Gage and the Playstation Portable, means that a growing number of users will potentially want to access virtual environments via portable wireless computing devices. When compared to their desktop counterparts, portable wireless computing devices have limited processing power and will connect to virtual environments via reasonably low bandwidth wireless links. Unfortunately, today's immersive audio communication technology is unlikely to efficiently support portable wireless computing devices (or other computing devices that have relatively low computing power) because the wireless computing devices may not have sufficient processing power to participant in distributed audio scene computations. A consequence of this is that much of the computationally intensive audio scene processing will be pushed back on to the virtual environment server. This basically means that more powerful servers may need to be employed if portable wireless computing devices are to be supported and provided with immersive audio communication.

SUMMARY OF THE INVENTION

According to a first aspect of the present invention there is provided a method of using audio for a virtual environment, the method comprising the steps of:

identifying a first avatar associated with the virtual environment;

determining whether an audio reuse criterion is satisfied in respect of audio information created for a second avatar associated with the virtual environment; and reusing the audio information for the first avatar on determining that the audio reuse criterion is satisfied.

An advantage of the method is that, unlike existing immersive audio technology, it has the potential to facilitate immersive audio communication for portable wireless communication devices (or any other device that has relatively low processing power). This advantage stems from the fact that the method involves reusing the audio information where possible (that is, when the audio reuse criterion is satisfied), which may reduce the process intensive task of creating immersive audio. By way of an example implementation, the method could be executed by one or more central audio scene creation servers to reduce audio scene processing requirements of the central server(s). In contrast to the present invention, existing immersive audio communication technologies do not employ an audio information reuse aspect and would thus require more processing resources than systems employing the present invention.

Preferably, the method further comprises the step of processing the audio information based on a distance between the first avatar and a third avatar associated with the virtual environment.

An advantage of performing the step of processing the audio is that it can be used to add a perception of distance to the reused audio information. For example, the processing step could involve attenuating the audio information to represent the audio information has traveled a certain distance.

Preferably, the method further comprises the step of creating alternative audio information for the first avatar on determining that the audio reuse criterion is not satisfied.

An advantage of creating the alternative audio information is that it provides a mechanism for obtaining audio for the first avatar in the event that the reuse criterion is not satisfied.

Preferably, the step of determining whether the audio reuse criterion is satisfied comprises determining whether the first avatar would perceive the audio information as emanating from a predefined area of the virtual environment in which the third avatar is located.

An advantage of determining whether the first avatar would perceive the audio information as emanating from the predefined area is that it provides a technique for ensuring reused audio information has spatial characteristics that are reasonably close to the spatial aspects of accurately created audio information, which could be created during the aforementioned step of creating alternative audio information.

Preferably, the audio information comprises spatial audio information.

According to a second aspect of the present invention there is provided a system for using audio for a virtual environment, the system comprising a processing means arranged to perform the steps of:

identifying a first avatar associated with the virtual environment;

determining whether an audio reuse criterion is satisfied in respect of audio information created for a second avatar associated with the virtual environment; and reusing the audio information for the first avatar on determining that the audio reuse criterion is satisfied.

Preferably, the processing means is further arranged to perform the step of processing the audio information based on a distance between the first avatar and a third avatar associated with the virtual environment.

Preferably, the processing means is further arranged to perform the step of creating alternative audio information for the first avatar on determining that the audio reuse criterion is not satisfied.

Preferably, the processing means is arranged such that the step of determining whether the audio reuse criterion is satisfied comprises determining whether the first avatar would perceive the audio information as emanating from a predefined area of the virtual environment in which the third avatar is located.

Preferably, the audio information comprises spatial audio information.

According to a third aspect of the present invention there is provided a computer program comprising at least one instruction that is arranged to cause a computing device to perform the method according to the first aspect of the present invention.

According to a fourth aspect of the present invention there is provided a computer readable medium comprising the computer program according to the third aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which:

FIG. 2(b) illustrates a technique by the system of FIG. 1 for creating immersive audio in accordance with an embodiment of the present invention.

AN EMBODIMENT OF THE INVENTION

Figure 1:
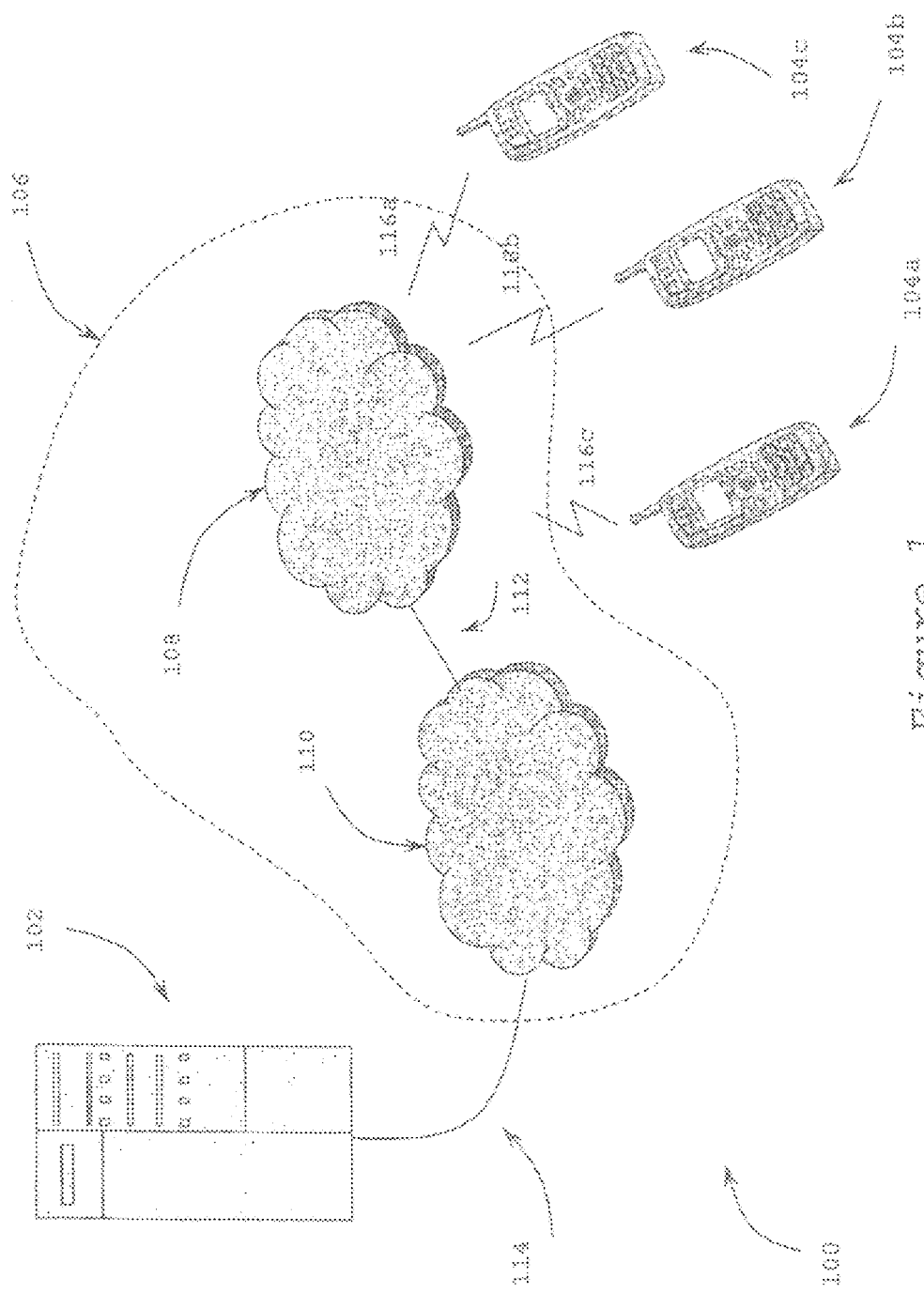
FIG. 1 shows a system including an embodiment of the present invention.

With reference to FIG. 1, the system 100 includes a virtual environment system 102; user computing devices 104; and a communication system 106.

The primary functions of the virtual environment system 102 are to maintain state information for a virtual environment and to provide participants in the virtual environment with immersive audio communication. In the present embodiment of the invention the virtual environment is a battlefield of a multiplayer on-line game and the avatars represent participants (that is, users of the user computing devices 104) in the virtual environment and are in the form of animated soldiers. The state information maintained by the virtual environment system 102 comprises, for example, the location of the avatars in the virtual environment; that is, the location of the soldiers in the battlefield.

It is noted that the present invention is not restricted to virtual environments and avatars for multi-player online games. The present invention has application to a range of virtual environments including, for example, virtual environments in a business context (such as a virtual staff meeting) or an educational context (such as a virtual lecture).

To perform the primary functions of maintaining the state information and providing the immersive audio communication the virtual environment system 102 comprises traditional computer hardware including a motherboard, central processing units, random access memory, hard disks, networking hardware and a power supply. In addition to the hardware, the virtual environment system 102 includes an operating system (such as Linux, which can be obtained from www.redhat.com) that resides on the hard disk of the system 102 and which cooperates with the hardware to provide an environment in which software applications can be executed. In this regard, the hard disk of the virtual environment system 102 is loaded with a virtual environment server application (such as the Quake engine, which can be obtained from www.idsoftware.com) for maintaining the state information and an immersive audio communication server application for providing participants in the virtual environment with immersive audio communication.

The user computing devices 104 are in the form of portable wireless communication devices such as the Nokia N-Gage and the Playstation Portable. However, it will be readily appreciated that the present invention is not restricted to portable wireless communication devices. It is envisaged that in alternative embodiments of the present invention the user computing devices 104 could be, for example, laptop or desktop computers. Each user computing device 104 comprises traditional computer hardware including a motherboard, central processing unit, random access memory, a hard disk, power supply, monitor and a user information input (for instance, a keyboard). In addition to the hardware, the hard disk of each user computing device 104 is loaded with the BlackBerry operating system. The operating system interacts with the hardware of the computing device 104 to provide an environment in which software applications can be executed. In this regard, the hard disk of each user computing device 104 is loaded with a virtual environment client application and an immersive audio communication client.

The virtual environment client application is arranged to send and receive the virtual environment state information for the virtual environment to and from the virtual environment server application loaded on the virtual environment system 102. The immersive audio communication client is arranged to send and receive audio information to and from the immersive audio communication server on the virtual environment system 102. It was described previously that each user computing device 104 is loaded with an operating system, such as the Symbian operating system for the Nokia N-Gage. The present invention is not restricted to the Symbian operating system and as such the present invention has application to different operating systems loaded on the user computing devices 104 including, for example, Microsoft Windows XP or Linux (both of which would typically be used when the computing devices 104 are in the form of a desktop computer).

The communication system 106 enables the virtual environment client application of each of the user computing devices 104 and the virtual environment server application of the virtual environment system 102 to exchange data (more specifically, the state information) with each other. The communication system 106 also enables the immersive audio communication client application of each of the user computing devices 104 and the immersive audio communication server application of the virtual environment system 102 to exchange data (more specifically, audio information) with each other.

To support the exchange of data the communication system 106 comprises a mobile telephone network 108 for sending and receiving data from the user computing devices 104. The present invention is not restricted to being used with the mobile telephone network 108 and an alternative embodiment of the present invention may employ, for example, an 802.11 based wireless network. In addition to the mobile telephone network 108, the communication system 106 comprises a public access Internet protocol based packet switched network 110 such as the Internet for sending and receiving data from the virtual environment system 102. The mobile telephone network 108 and the communication system 106 are interconnected to each other via a communication link 112, which is in the form of a high speed fibre optic link. The communication link 112 enables data to be exchanged between the mobile telephone network 108 and the packet switched network 110.

To enable the virtual environment system 102 and the user computing devices 104 to exchange data via the communication system 106 the virtual environment server 102 is connected to the packet switched network 110 via a communication link 114 in the form of a high speed data link. Furthermore, the user computing devices 104 are each connected to the mobile telephone network 108 via wireless GPRS links 116.

The embodiment of the present invention is primarily concerned with the provision of immersive audio communication. As such, the following description of the embodiment focuses on the functionality performed by the immersive audio communication client application loaded on the user computing devices 104 and the immersive audio communication server application loaded on the virtual environment system 102.

There are two main functions performed by the immersive voice communication client application. The first function is to forward audio information (for example, a user's voice) captured by the user computing device 104 on to the immersive audio communication server loaded on the virtual environment system 102. The second function is to receive an audio scene (immersive audio communication information) from the immersive audio communication server loaded on the virtual environment system 102, and to render the audio scene to a user of the user computing device 104. Rendering the audio scene basically involves playing the audio scene through speakers or headphones.

The immersive audio communication server application loaded on the virtual environment system 102 also performs two main functions. First, the server application processes audio information received from the immersive audio communication clients to create an audio scene for each of the avatars in the virtual environment. Second, the server application forwards the audio scenes to the user computing devices 104. In relation to the first function of creating the audio scenes, it is envisaged that any suitable spatial audio process algorithm can be employed. However, in the case of the present embodiment the immersive audio communication server application is arranged to use a Head Related Transfer Function (HRTF) algorithm, details of which are set out in the publication entitled "3-*D Sound for Virtual Reality and Multimedia*" which appeared in Academic Press Professional, Cambridge, Mass., USA, 1994 and was authored by Durand R. Begault.

In addition to performing the head related transfer function, the immersive audio communication server application is arranged to carry out an audio scene reuse algorithm. The aim of the audio scene reuse algorithm is to potentially minimise head related transfer function operations performed by the immersive audio server application, which in turn minimises the processing resources required to create the audio scene. It is the reuse algorithm that essentially makes the present invention suitable for supporting low processing power devices (such as wireless portable computing devices) with immersive audio for a virtual environment. The following description describes the audio scene reuse algorithm with reference to FIG. 2, which represents a virtual environment including three avatars A1, A2 and A3, all of which are facing the same absolute direction (say, for example, north). This assumption has been made to simplify this description of the embodiment of the present invention. In reality, however, the avatars may be facing different directions.

Figure 2A:
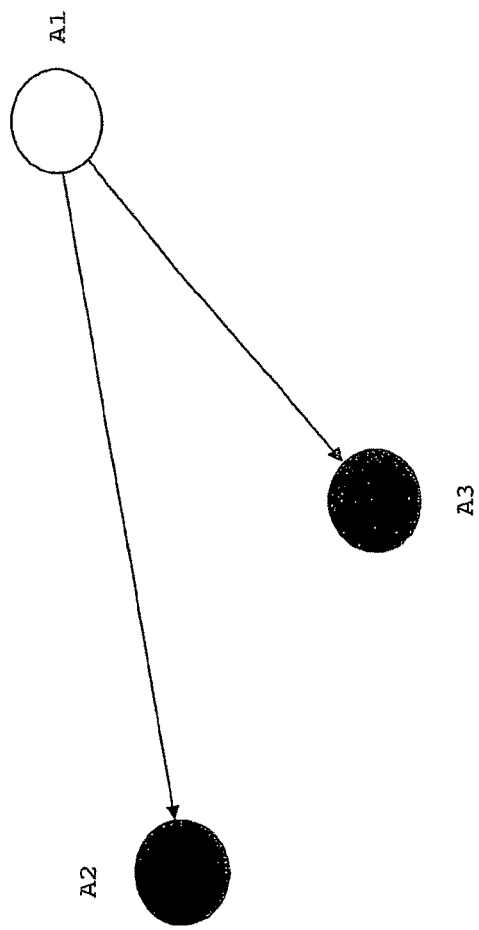
FIG. 2(a) illustrates a technique used by existing immersive audio techniques.

An example of the reuse is shown in FIG. 2. FIG. 2(*a*) shows the result of how existing immersive audio communication technologies accurately place real-time speech from avatar A1 in the audio scenes for A2 and A3. This requires two spatial placement operations involving two separate head related transform function computations—one for each listener, A1 and A3. Performing accurate placement can be computationally intensive, particularly when many avatars are involved. In contrast, FIG. 2(*b*) shows the result of the reuse algorithm. A1 is accurately rendered in the audio scene for A3 using the head related transfer function. The audio scene for A3 is reused as the audio scene for avatar A2. As a result A2 will hear A1 inaccurately as if it is coming from A1'. The reused audio scene will also be attenuated since it is further away from A1 than A3 is. The cost for this reuse scenario is one spatial placement operation (that is, one head related transfer function) and one attenuation operation.

It is noted that the reuse algorithm is such that in the scenario described in FIG. 2(*b*) the algorithm may render A1 inaccurately (that is, reuse an audio scene) for both A2 and A3 if it can increase the number of reused audio scenes, provided the reused audio scenes are not too inaccurate.

The reuse algorithm does not simply reuse audio scenes indiscriminately. Before reusing an audio scene the reuse algorithm determines whether an audio reuse criterion is satisfied. In this regard, this embodiment of the present invention uses the concept of angular error as the reuse criterion. With reference to FIG. 2(*b*), the angular error is the angle defined by the vectors that extend from avatar A1 to avatars A2 and A3. The reuse algorithm is such that the audio scene for A3 is reused for A2 if the angle defined by the vectors is equal to or less than a predefined angle (which is also referred to as "angular error").

It is noted that the reuse criterion is not restricted to the previously described concept of an angular error. In alternative embodiments of the present invention the reuse criterion can be based on the distance between avatars. Alternatively the angular error concept may not be fixed and could, for example, be a relatively small angular error for avatars in a certain distance (say 10 m) and a larger angular error for avatars further than this distance.

A more formal description of the functions performed by the immersive audio server application is as follows:

Given a virtual world with N avatars (A1, A2, . . . An) each controlled by clients (C2, C2, . . . CN). Audio samples ($V_i$) are received from each of these clients.

1. Calculate the set of speaking avatars that each avatar (i) can hear and place this set in $S_i$.
2. Repeat until each set $S_i$ is empty or a processing limit has been reached
   a. For i=1 to N
      i. Find the closest speaker ($A_j$) in the set $S_i$
      ii. If a spatialised version ($H_{ji}$) of the audio from $A_j$ from the perspective of avatar i has not been calculated previously within acceptable error then:
         1. Create $H_{ji}$ a spatialised version of the audio $V_j$ from avatar $A_j$ accurately rendered from the perspective avatar $A_i$.

2. Add a weighted copy of $H_{ji}$ to the set $R_i$ which is the set of rendered objects in the audio scene for listener i. The weighting applied is a function of the relative distance between i and j in the virtual world.

iii. Else

1. Add a weighted copy of the rendered object $H_{ji}$ which is within acceptable error to the set $R_i$. The weighting applied is a function of the relative distance between i and j in the virtual world.

iv. Remove $A_j$ from the set $S_i$ b. End for loop 3. end while

Figure 3:
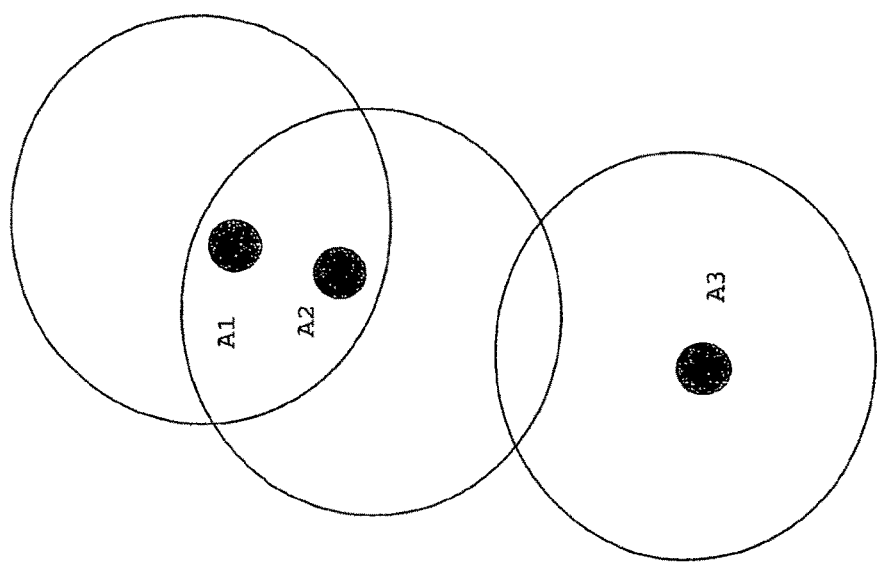
FIG. 3 is a representation of a virtual environment to which the system of FIG. 1 is applied.

As an example of how the immersive audio server requires less processing power than existing immersive audio techniques consider the following example in which the acceptable angular error is 10 degrees between 0 and 10 meters from the listener and 30 degrees from 10 meters to the edge of each avatars hearing range. Using the virtual world depicted in FIG. 3 it is assumed all avatars can hear each other and the circle around each avatar has a radius of 10 m. Working through the above formal definition of the reuse algorithm:

A1 requires an accurate rendering of A2 (H2,1)
A2 requires an accurate rendering of A1 (H1,2)
A3 requires an accurate rendering of A2 (H2,3)
A1 requires an accurate rendering of A3 (H3,1)
A2 can reuse H3,1 since it would introduce an angular error less than 30 degrees
A3 can reuse H1,2 since it would introduce an angular error less than 30 degrees Using the reuse mechanism the number of rendering calculations required in the server is reduced from 6 (which would have occurred using existing techniques) to 4.

It will be readily appreciated that even though the embodiment of the present invention has been described in the context of being used to support a virtual environment, the present invention is not restricted to being used with a virtual environment. As such, the present invention could be used to provide only an immersive audio system for use as, for example, an audio only conferencing system.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

The invention claimed is:

1. A method of using audio for a virtual environment, the method comprising:
    identifying a first avatar associated with a virtual environment;
    rendering audio information from a source for a second avatar;
    determining whether an audio reuse criterion is satisfied in respect to the rendered audio information, the audio reuse criterion comprising at least measuring an angular error between the first avatar and the second avatar relative to the source, the angular error is an angle defined by a first vector extending from the source to the first avatar and a second vector extending from the source to the second avatar, the audio reuse criterion is satisfied at least when the angle is equal to or less than a certain angle, the certain angle indicates an area where inaccurate reproduction of the rendered audio information is acceptable;
    reusing the rendered audio information for the first avatar upon determining that the audio reuse criterion is satisfied, wherein the rendered audio information is reused without modification thereby reducing audio scene processing requirements; and
    creating alternative audio information from the source for the first avatar upon determining that the audio reuse criterion is not satisfied.

2. The method as claimed in claim 1, further comprising processing the audio information based on a distance between the first avatar and a third avatar.

3. The method as claimed in claim 1, wherein the step of determining whether the audio reuse criterion is satisfied comprises determining whether the first avatar would perceive the audio information as emanating from a specified area of the virtual environment in which the source is located.

4. The method as claimed in claim 1, wherein the audio information comprises spatial audio information.

5. A system for using audio for a virtual environment, the system comprising a processing means arranged to perform the steps of:
    identifying a first avatar associated with a virtual environment;
    rendering audio information from a source for a second avatar;
    determining whether an audio reuse criterion is satisfied in respect to the rendered audio information, the audio reuse criterion comprising at least measuring an angular error between the first avatar and the second avatar relative to the source, the angular error is an angle defined by a first vector extending from the source to the first avatar and a second vector extending from the source to the second avatar, the audio reuse criterion is satisfied at least when the angle is equal to or less than a certain angle, the certain angle indicates an area where inaccurate reproduction of the rendered audio information is acceptable;
    reusing the rendered audio information for the first avatar upon determining that the audio reuse criterion is satisfied, wherein the rendered audio information is reused without modification thereby reducing audio scene processing requirements; and
    creating alternative audio information from the source for the first avatar upon determining that the audio reuse criterion is not satisfied.

6. The system as claimed in claim 5, wherein the processing means is further arranged to perform the step of processing the audio information based on a distance between the first avatar and a third avatar.

7. The system as claimed in claim 5, wherein the processing means is arranged such that the step of determining whether the audio reuse criterion is satisfied comprises determining whether the first avatar would perceive the audio information as emanating from a specified area of the virtual environment in which the source is located.

8. The system as claimed in claim 5, wherein the audio information comprises spatial audio information.

9. A non-transitory computer readable medium storing software instructions, which when executed by one or more processors cause performance of the steps of:
- identifying a first avatar associated with a virtual environment;
- rendering audio information from a source for a second avatar;
- determining whether an audio reuse criterion is satisfied in respect to the rendered audio information, the audio reuse criterion comprising at least measuring an angular error between the first avatar and the second avatar relative to the source, the angular error is an angle defined by a first vector extending from the source to the first avatar and a second vector extending from the source to the second avatar, the audio reuse criterion is satisfied at least when the angle is equal to or less than a certain angle, the certain angle indicates an area where inaccurate reproduction of the rendered audio information is acceptable;
- reusing the rendered audio information for the first avatar upon determining that the audio reuse criterion is satisfied, wherein the rendered audio information is reused without modification thereby reducing audio scene processing requirements; and
- creating alternative audio information from the source for the first avatar upon determining that the audio reuse criterion is not satisfied.

10. The non-transitory computer readable medium of claim 9, further comprising the step of processing the audio information based on a distance between the first avatar and a third avatar.

11. The non-transitory computer readable medium of claim 9, wherein the step of determining whether the audio reuse criterion is satisfied comprises determining whether the first avatar would perceive the audio information as emanating from a specified area of the virtual environment in which the source is located.

12. The non-transitory computer readable medium of claim 9, wherein the audio information comprises spatial audio information.

* * * * *